US006414587B1

(12) United States Patent
Fitzgibbon

(10) Patent No.: US 6,414,587 B1
(45) **Date of Patent: *Jul. 2, 2002**

(54) CODE LEARNING SYSTEM FOR A MOVABLE BARRIER OPERATOR

(75) Inventor: James J. Fitzgibbon, Streamwood, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/444,175

(22) Filed: Nov. 19, 1999

Related U.S. Application Data

(63) Continuation of application No. 09/042,167, filed on Mar. 13, 1998.

(51) Int. Cl.[7] .................................................. G06F 7/04

(52) U.S. Cl. .................................. 340/5.22; 340/825.72

(58) Field of Search ................................ 340/5.22, 5.7, 340/825.72, 825.69; 379/93.02, 93.05, 102.01, 102.06

(56) References Cited

U.S. PATENT DOCUMENTS

| | | | |
|---|---|---|---|
| 3,906,348 A | 9/1975 | Willmott | 325/37 |
| 4,037,201 A | 7/1977 | Willmott | 340/167 R |
| 4,141,010 A | 2/1979 | Umpleby et al. | 343/225 |
| 4,305,060 A | 12/1981 | Apple et al. | 340/825.65 |
| 4,529,980 A | 7/1985 | Liotine et al. | 340/825.52 |
| 4,535,333 A | 8/1985 | Twardowski | 340/825.69 |
| 4,583,081 A | 4/1986 | Schmitz | 340/545 |
| 4,638,433 A | 1/1987 | Schindler | 364/400 |
| 4,750,118 A | 6/1988 | Heitschel et al. | 364/400 |
| 4,821,024 A | 4/1989 | Bayha | 340/545 |
| 4,988,992 A | 1/1991 | Heitschel et al. | 340/825.69 |
| 5,453,736 A | 9/1995 | Noren | 340/825.22 |
| 5,481,452 A | 1/1996 | Simmons | 364/141 |
| 5,533,561 A | 7/1996 | Forehand, IV | 160/188 |
| 5,751,224 A | 5/1998 | Fitzgibbon et al. | 340/825.22 |
| 6,081,203 A * | 6/2000 | Fitzgibbon | 340/825.72 |

* cited by examiner

*Primary Examiner*—Michael Horabik
*Assistant Examiner*—William L. Bangachon
(74) *Attorney, Agent, or Firm*—Fitch, Even, Tabin & Flannery

(57) ABSTRACT

A movable barrier or garage door operator has a control head controlling an electric motor connected to a movable barrier or garage door to open and close it. The control head has an RF receiver for receiving RF signals from a hand-held transmitter or a fixed keypad transmitter. The receiver operates the electric motor upon matching a received code with a stored code. The stored codes may be updated or loaded either by enabling the learn mode of the receiver from the fixed keypad transmitter or from a wired control unit positioned within the garage.

6 Claims, 11 Drawing Sheets

| Fig. 3a | Fig. 3b | Fig. 3c |
|---|---|---|

CODE LEARNING SYSTEM FOR A MOVABLE BARRIER OPERATOR

This is a continuation of prior application Ser. No. 09/042,167, filed Mar. 13, 1998, now U.S. Pat. No. 6,081, 203, which is a continuation of application Ser. No. 08/442, 909, filed May 17, 1995, now U.S. Pat. No. 5,751,224.

BACKGROUND OF THE INVENTION

The invention relates, in general, to movable barrier operators and, in particular, to garage door operators having systems for receiving radio frequency transmissions that are encoded or encrypted to identify an authorized user of one or more transmitters.

A number of systems already exist for the control of movable barrier garage door operators using radio frequency transmitters. For instance, U.S. Pat. No. 4,750,118 discloses a transmitter for transmitting a multiple bit code which, when received and decoded by a receiver, causes the receiver to command a motor to open or close a garage door. Other systems, such as that disclosed in U.S. Pat. No. 3,906,348, employ a transmitter and a receiver wherein a plurality of mechanical switches may be used to establish a stored authorization code.

U.S. Pat. No. 4,529,980 to Liotine et al. discloses a transmitter and receiver combination for use in a garage door operator wherein the transmitter is able to store an authorization code which is to be transmitted to and received by the receiver over a radio frequency link. In order to alter or update the authorization code contained within the transmitter, the receiver is equipped with a programming signal transmitter or light emitting diode that can send a digitized optical signal back to the transmitter where it is stored. Other systems employing coded transmissions are disclosed in U.S. Pat. Nos. 4,037,201, 4,535,333, 4,638,433 and 4,988,992.

While each of these systems has in the past provided good security for operational use, they are relatively inconvenient or insecure for a user who wishes to establish a new fixed code for storage in a receiver. Many of the currently-available garage door operators include equipment that enables the receiver to learn a particular code. However, they are relatively inconvenient to use because they must be accessed by pressing a learn code button located on the head unit of the receiver which, of course, is normally mounted from the ceiling of the garage. Thus, the user would have to climb a step ladder, push the learn button and then either send newly encoded signals from an outside keypad or from a transmitter. If the apparatus does not employ an actuator which would cause a door to be moved, but relates, for instance, to an automotive security system, the learn button of necessity must be made even more inaccessible than the learn button on a garage door operator. For instance, an auto security system learn button might be positioned someplace under-neath a locked hood or the like. Thus, it is very inconvenient, due to security requirements, to obtain access to the learn button.

What is needed then is an improved movable barrier operator or other type of actuator system employing coded transmissions which provide good security while enabling a code to be easily and conveniently altered.

SUMMARY OF THE INVENTION

The invention relates, in general, to an apparatus for controlling an actuator in response to receiving a coded transmission. The apparatus includes a portable radio frequency transmitter, a fixed radio transmitter, such as a keypad device, a wired control device connectable via direct wire connection, all connectable to a head unit or other actuator device. The system includes means for learning a new code from a transmitter or learning a new code from a fixed keypad having an RF transmission system. In the event that the fixed keypad is employed, the operator typically has an alphanumeric keyboard associated with the keypad having keys. A code may first be entered which allows the person to have access. This code is then followed by a learn authorization code which, for instance, may be 0000 or some other easily remembered combination of alphanumeric characters. At that point, the head unit authorizes receipt of a new code. The new code is then typed in on the alphanumeric pad of the keypad and is received by the head unit and stored therein as a new code from which to respond.

In an alternative mode of operating the code learning system, a radio frequency transmitter or the like may be used to enter a code which is to be stored within a receiver in the head unit. If such a radio frequency transmitter is to be used, the security to prevent unauthorized changing of the transmitter code is achieved through the use of the control pad which is located on the inside of the garage. The light switch for the control pad is held down and as it is held down, the command switch is actuated. The combination of the command signal and the light or work light signal is received by the head unit and the head unit then switches into a learn mode. The radio frequency transmitter must be up and transmitting a code at the time that the command button is pushed so that a code is immediately received by the antenna of the head unit. The code will then be stored in the receiver associated with the head unit and, from then on, actuation of the transmitter having that code stored therein will cause the garage door operator to be actuated. Thus, it is apparent that the system provides high security requiring the entry of a code or access to a secured area. Access is restricted to authorized users by either forcing the user to enter the work light followed by the command keystroke on the interior pad for which one can only obtain access if they have a key to the garage or a transmitter which can open the garage door with an already authorized code. Authorization is provided in the alternative by allowing access through the keypad on the outside of the garage door, but requiring that a code that matches one of the authorization codes already stored in the head unit be entered manually before the system even can accept a learn command. It may be appreciated that although the system may still include a learn button mounted on the head unit as a fail safe for reprogramming of the garage door operator, the ability to reprogram either directly from the RF keypad mounted on the outside of the garage or by using the inside wired control allows rapid and easy reprogramming without subjecting the user to the inconvenience of having to actuate the learn button on the head unit.

It is a principal object of the present invention to provide a code driven apparatus having a secure yet simple system for allowing learning of a code from a radio frequency transmitters Other objects of this invention will become obvious to one of ordinary skill in the art upon a perusal of the following specification and claims in light of the accompanying drawings.

DETAILED DESCRIPTION OF THE PREFERRED EMBODIMENT

Figure 1:
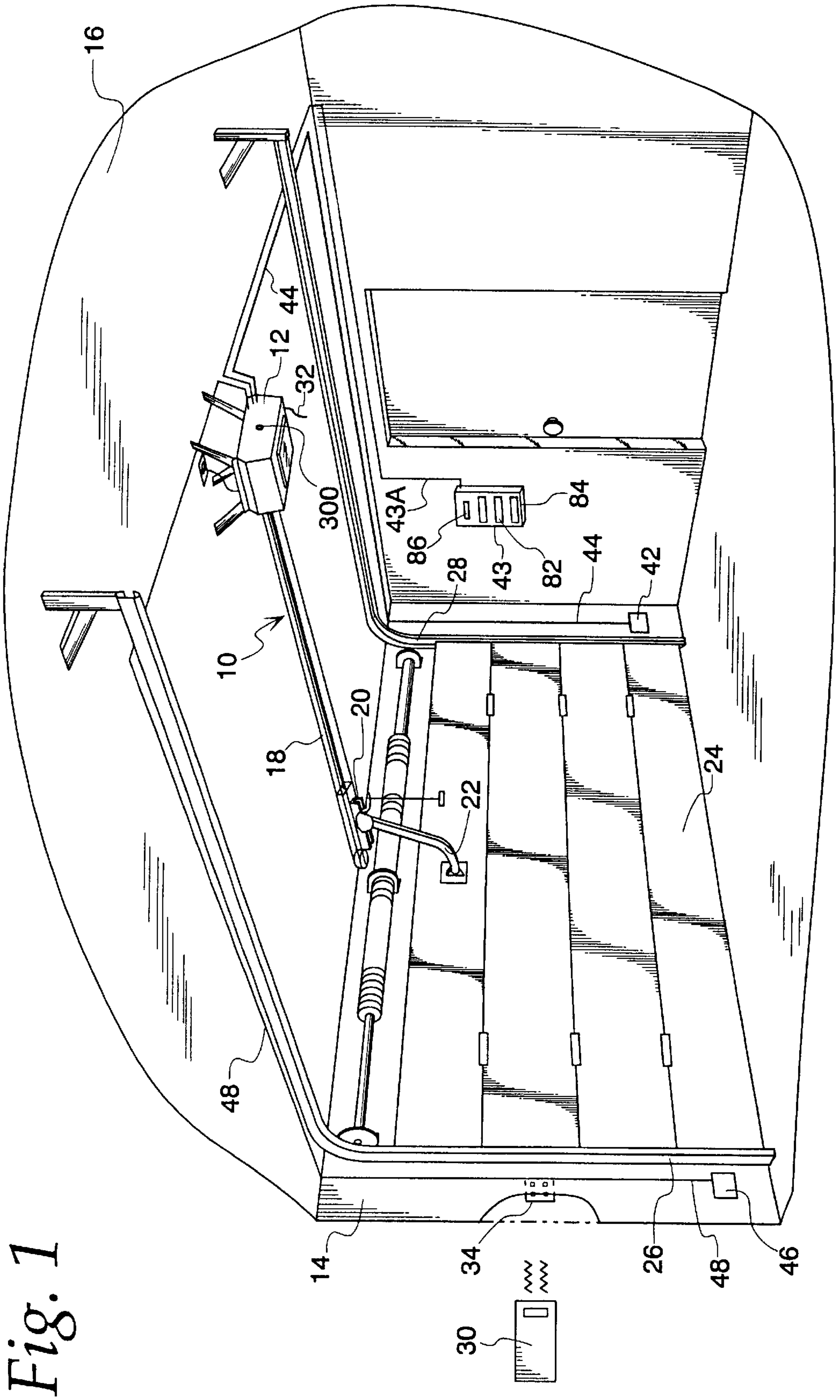
FIG. 1 is a perspective view of an apparatus comprising a garage door operator and embodying the present invention.
Figure 2:
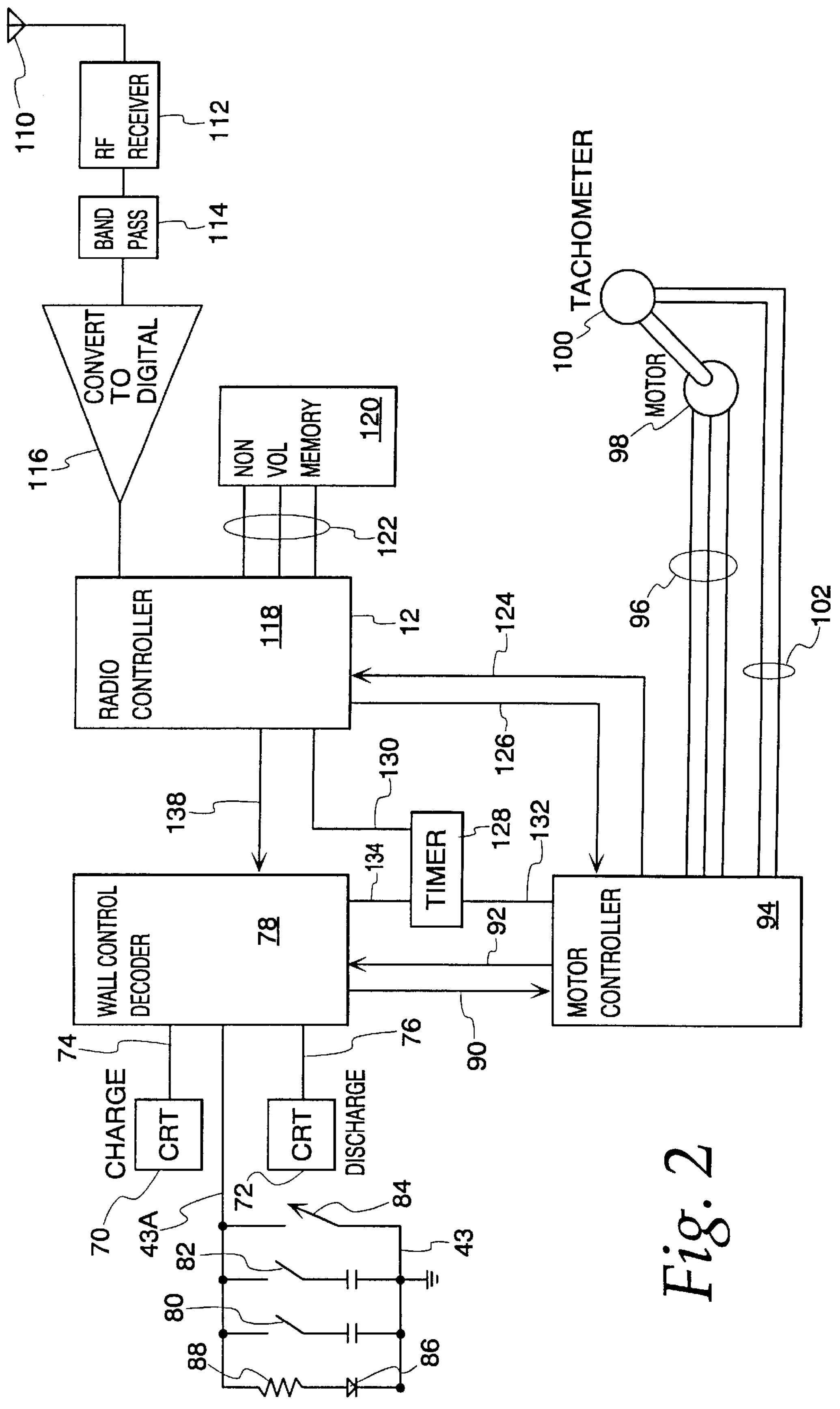
FIG. 2 is a block diagram of a portion of the head unit and associated controls of the apparatus shown in FIG. 2.

Referring now to the drawings and especially to FIG. 1, more specifically a movable barrier door operator or garage door operator is generally shown therein and includes a head unit 12 mounted within a garage 14. More specifically, the head unit 12 is mounted to the ceiling of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 and coupled to a receiver as will appear hereinafter. An external control pad 34 is positioned on the outside of the garage having a plurality of buttons thereon and communicate via radio frequency transmission with the antenna 32 of the head unit 12. An optical emitter 42 is connected via a power and signal line 44 to the head unit. An optical detector 46 is connected via a wire 48 to the head unit 12.

The head unit 12 has a wall control panel 43 connected to it via a wire or line 43*a*. More specifically the wall control panel 43 is connected to a charging circuit 70 and a discharging circuit 72, coupled via respective lines 74 and 76 to a wall control decoder 78. The wall control decoder 78 decodes closures of a lock switch 80, a learn switch 82 and a command switch 84 in the wall circuit. The wall control panel 43 also includes a light emitting diode 86 connected by a resistor 88 to the line 43 and to ground to indicate that the wall control panel 43 is energized by the head unit 12. Switch closures are decoded by the wall decoder 78 which sends signals along lines 90 and 92 to a motor control 94 coupled via motor control lines 96 to an electric motor 98 positioned within the head unit 12. A tachometer 100 receives a mechanical feed from the motor 98 and provides feedback signals indicative of the motor speed or motion on lines 102 to the motor controller 94.

The receiver unit also includes an antenna 110 coupled to receive radio frequency signals either from the fixed RF keypad 34 or the hand-held transmitter 30. The RF signals are fed to a radio frequency receiver 112 where they are buffer amplified and supplied to a bandpass circuit 114 which outputs low frequency signals in the range of 1 Hz to 1 kHz. The low frequency signals are fed to an analog-to-digital converter 116 that sends digitized code signals to a radio controller 118. The radio controller 118 is also connected to receive signals from a non-volatile memory 120 over a non-volatile memory bus 122 and to communicate via lines 124 and 126 with the motor controller 94. A timer 128 is also provided, coupled via lines 130 with the radio controller, a line 132 with the motor controller and a line 134 with the wall control decoder 78.

Figure 3A:
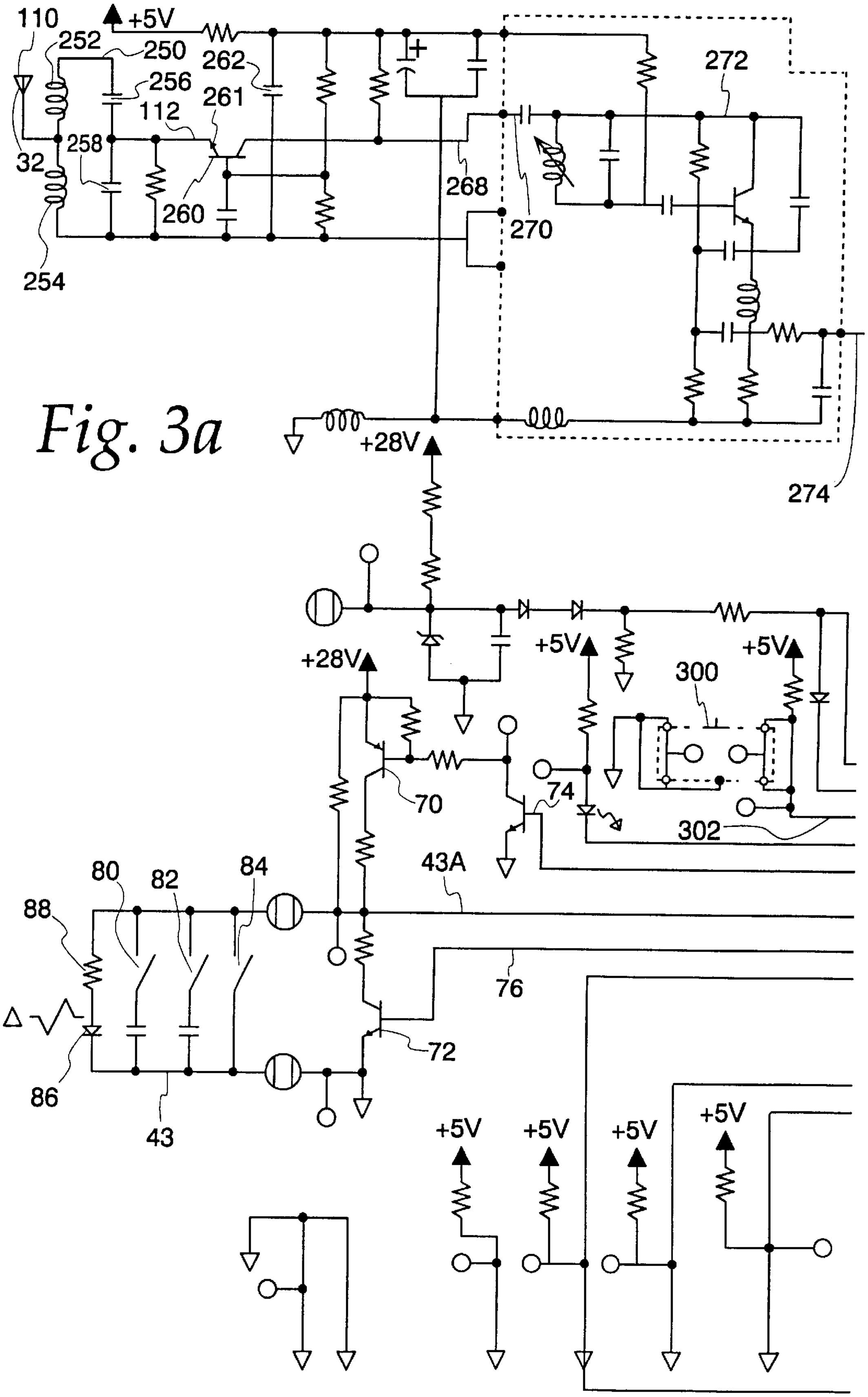
FIG. 3 is a schematic diagram showing details of the circuit shown in FIG. 2.
Figure 3B:
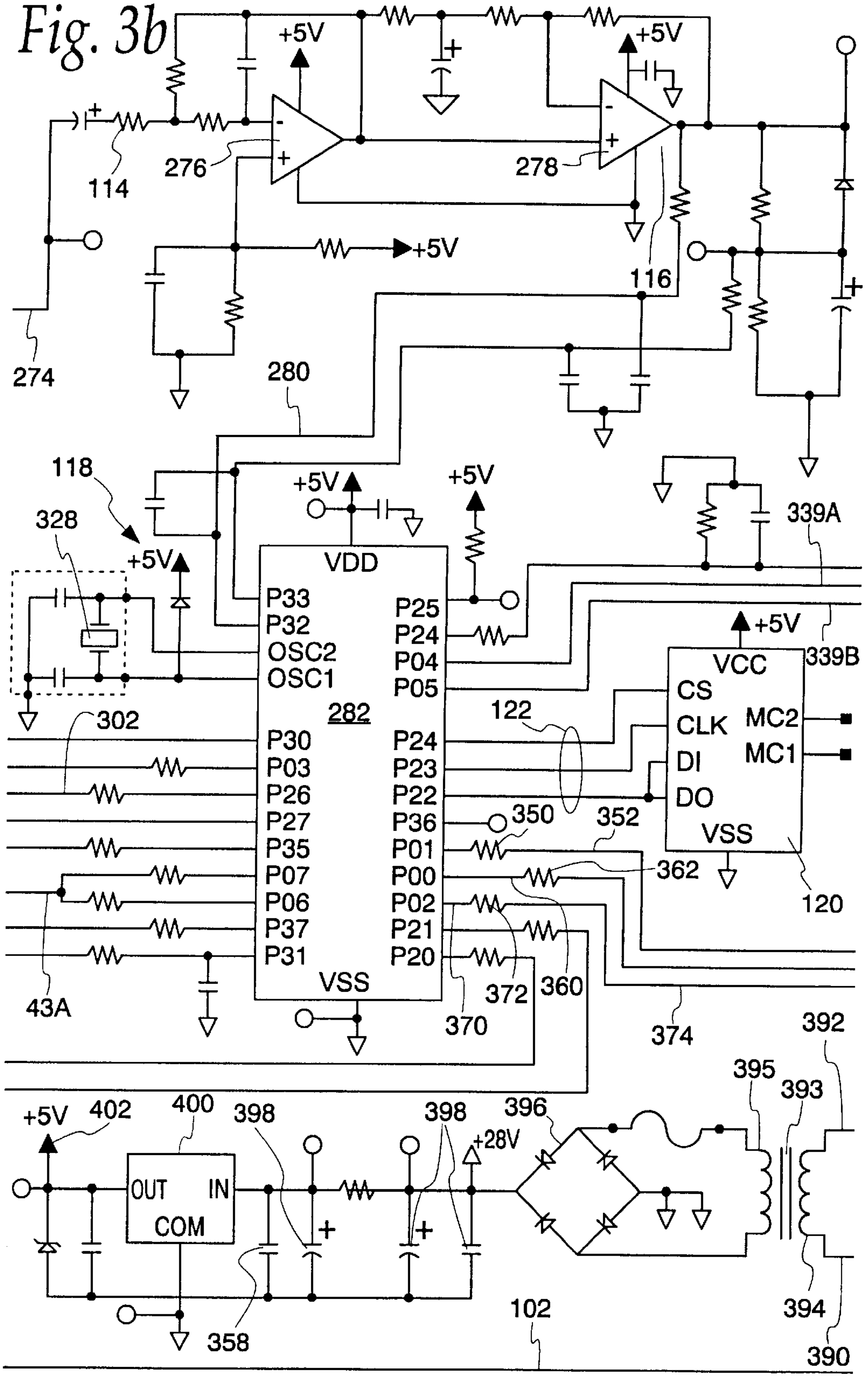
Figure 3C:
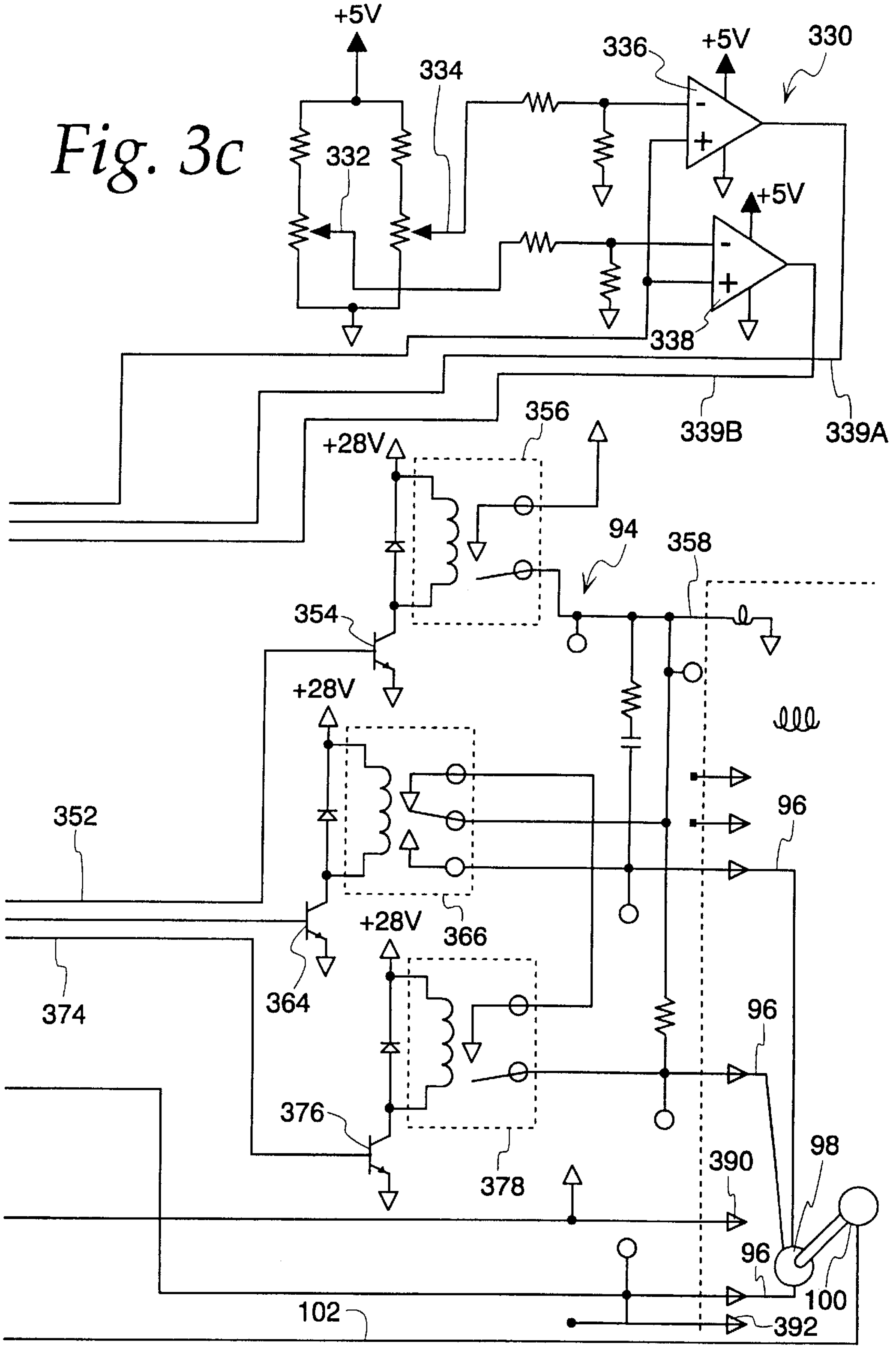

Referring now to FIG. 3, the system shown in FIG. 3 is shown therein with the antenna 110 coupled to a reactive divider network 250, comprised of a pair of series connected inductances 252 and 254 and capacitors 256 and 258, which supplies an[ R]F signal to the buffer amplifier 112 having an NPN transistor 260 connected to receive the RF signal at its emitter 261. The NPN transistor 260 has a capacitor 262 connected to it for power supply isolation. The buffer amplifier 112 provides a buffered radio frequency output signal on a lead 268. The buffered RF signal is fed to an input 270 which forms part of a super-regenerative receiver 272 having an output at a line 274 coupled to the bandpass filter 114 which provides output to a comparator 278. The bandpass filter 114 and analog-to-digital converter provide a digital level output signal at a lead 280 which is supplied to an input pin P32 of an 8-bit Zilog micro-controller 282.

The micro-controller 282 may have its mode of operation controlled by a programming or learning switch 300 positioned on the outside of the head unit 12 and coupled via a line 302 to the P26 pin of the micro-controller 282. The wired control panel 43 is connected via the lead 43*a* to input pins P06 and P07. The micro-controller 282 has a 4 MHz crystal 328 connected to it to provide clock signals. A force sensor 330 includes a bridge circuit having a potentiometer 332 for setting the up force and a potentiometer 334 for setting the down force, respectively connected to inverting terminals of a first comparator 336 and a second comparator 338. The comparator 336 sends an up force signal over a line 339*a*. The comparator 338 sends a down force signal over the line 339*b*, respectively to pins P04 and P05 of the 8-bit microcontroller 282. Although details of the operation of the microcontroller in conjunction with other portions of the circuit will be discussed hereinafter, it should be appreciated that the P01 pin of the microcontroller is connected via a resistor 350 to a line 352 which is coupled to an NPN transistor 354 that controls a light relay 356 which may supply current via a lead 358 to a light in the head unit or the like. Similarly, the pin P000 feeds an output signal on a line 360 to a resistor 362 which biases a base of an NPN transistor 364 to cause the transistor 364 to conduct, drawing current through the coil of the relay an up relay 366 causing an up motor command to be sent over a line 96 to the motor 98. Finally, the P02 pin sends a signal through a line 370 to a resistor 372 via a line 374 to the base of an NPN transistor 376 connected to control current through a coil of a down control relay 378 which is coupled by one of the leads to the motor 98 to control motion of the motor 98.

Electric power is received on a hot AC line 390 and a neutral line AC line 392 which are coupled to a transformer 393 at its primary winding 394. The AC is stepped down at a secondary winding 395 and is full wave rectified by a full wave rectifier 396. It may be appreciated that, in the alternative, a half wave rectifier may also be used.

A plurality o f filter capacitors 398 receive the full wave rectified fluctuating voltage and remove some transients from the voltage supplying a voltage with reduced fluctuation to an input of a voltage regulator 400. The voltage regulator 400 produces a 5-volt output signal available at a lead 402 for use in other portions of the circuit.

Figure 4:
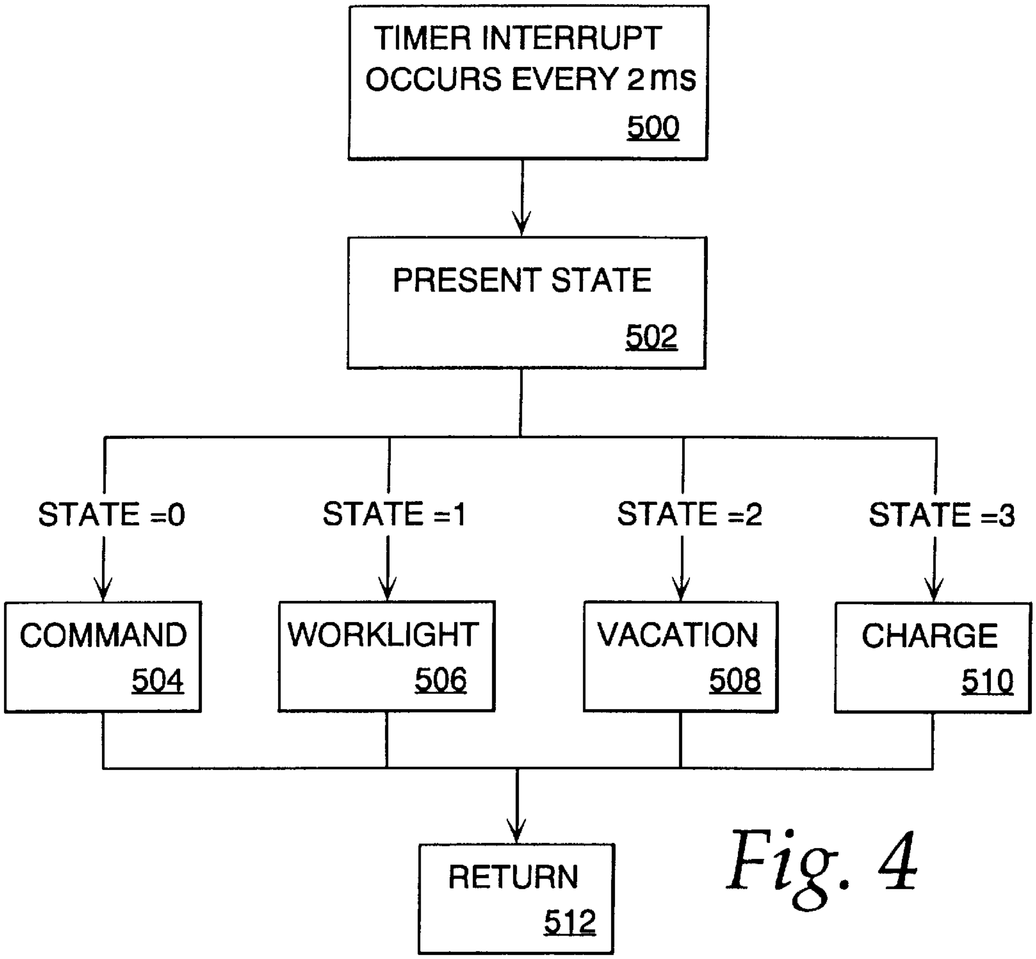
FIG. 4 is a top level flow chart showing details of the execution of program code in the micro-controller shown in FIG. 3.

Referring now to FIG. 4, the top level program flow for execution of a portion of the program on the microcontroller 282 is shown therein. A timer interrupt is generated every 2 milliseconds and then when that occurs in a step 500, the present state of the program is checked in the step 502. If the state is zero, control is transferred to a command module. if the state is 1, control is transferred to a work light module in the step 506. Control is transferred in a step 508 to a vacation switch routine if the state is 2 and if the state is 3, control is transferred to a switch charging routine in a step 510. Once each of those routines are ended, a step 512 is entered indicating a return to other portions of the program until the timer interrupt again occurs. Thus, the top level program flow is similar to a realtime controller flow in that periodically, as the state changes, the command, work light, vacation and charge routines are entered.

Figure 5:
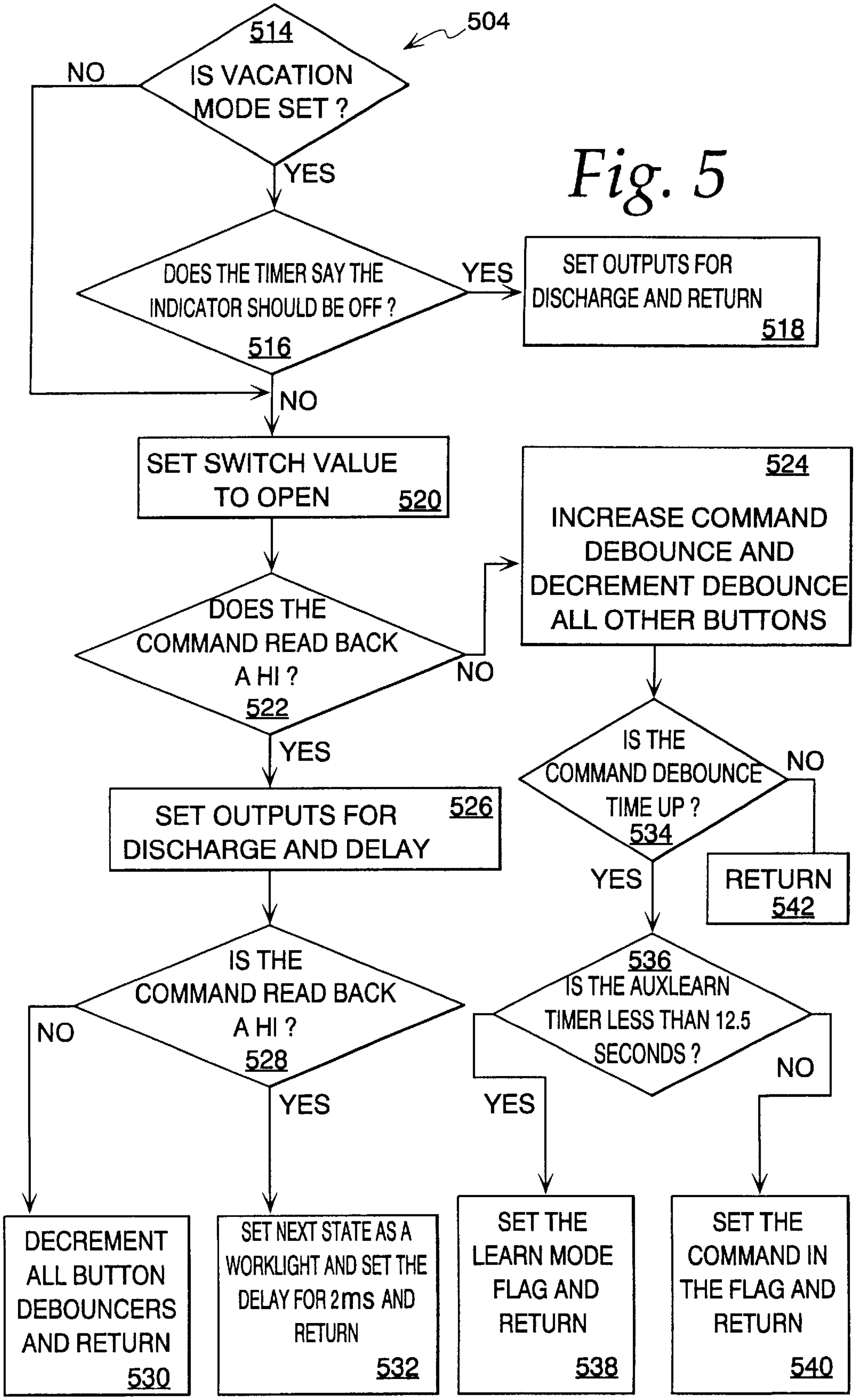
FIG. 5 is a flow chart describing the operation of a command switch and learn switch interrogation.

Referring now to FIG. 5, the command routine 504 is set forth therein. In a step 514, a test is made to see if the vacation mode has been set in the microcontroller. If it has been, a test is made to determine whether the time. includes an operand indicating that the indicator should be off. If so, control is transferred to a step 18 where outputs are set for switch discharge and return. If not, control is transferred to a step 520 where the switch value is set to open. Also, in the event that the step 514 test indicates that the vacation mode has not been set, control is directly transferred to the step 520. Following switch setting in the step 520, a test is made in a step 522 to determine whether the command reads back a high signal. If it does not, the command debounces increase and the debounce for all other button pushes is decremented in a step 524. In the even that the command read back is high, control is transferred to a step 526 where outputs are set for discharge and delay. In a step 528, a test is again made to determine whether the command read back is a high. If it is, control is transferred to a step 532 where the next state signal is set equal to one indicating the work light and a delay is set for 2 milliseconds following which control is transferred back to step 512. In the event the command read back is not high in step 528, control is transferred to a step 530 where all button debounces are decremented and control is transferred back to the return step 512. In the event that step 524 has been executed, control is transferred to a step 534 testing whether the command debounce time has expired. If it has, control is transferred to a step 536 where the auxiliary learn timer is tested to see whether it contains a stored value of less than 12 ½ seconds. If it does, control is transferred to a step 538 where the learn mode flag is set and the routine is exited to the return step 512. If the auxiliary learn timer is greater than 12 ½ seconds, control is transferred to step 540 to set the command in the flag and control is transferred back to the return step 512.

Figure 6:
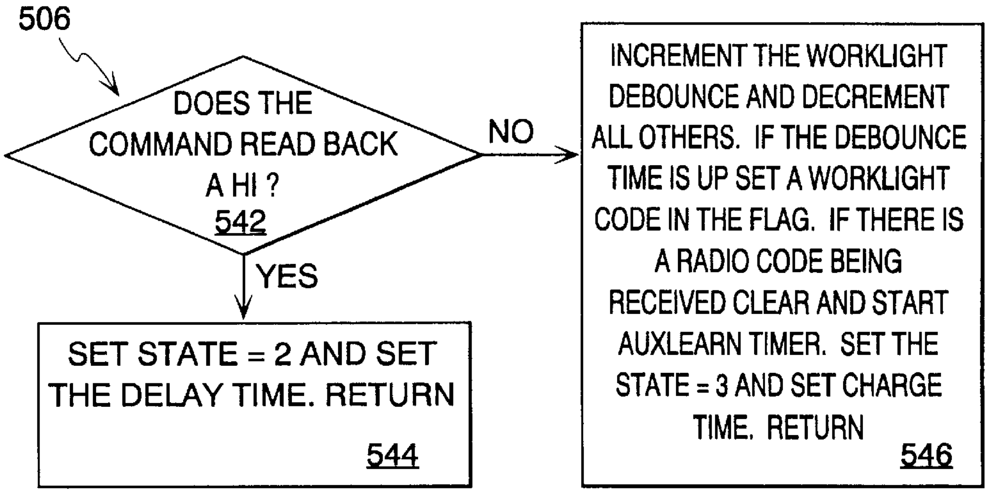
FIG. 6 is a flow chart of a command state and a worklight state examination routine.

Referring now to FIG. 6, the work light routine 506 is set forth therein. The initial step is a decision step 542 where a test is made to determine whether the command read back is a high signal. If it is, control is transferred to the step 544 where the state is set equal to 2 and the delay time is set followed by control being transferred to the return step 512. If the command read back signal is not high, a step 546 is entered wherein the work light is incremented. All other debounce signals are decremented. If the debounce time has expired for the work light, a work light code flag is set. A test is made to determine whether a radio code is being received clearly, and if it is, the auxiliary learn timer is started, followed by the state signal being set equal to 3 indicative of entry of the charge routine 510 thereafter, and the charge time is set followed by a return.

Figure 7:
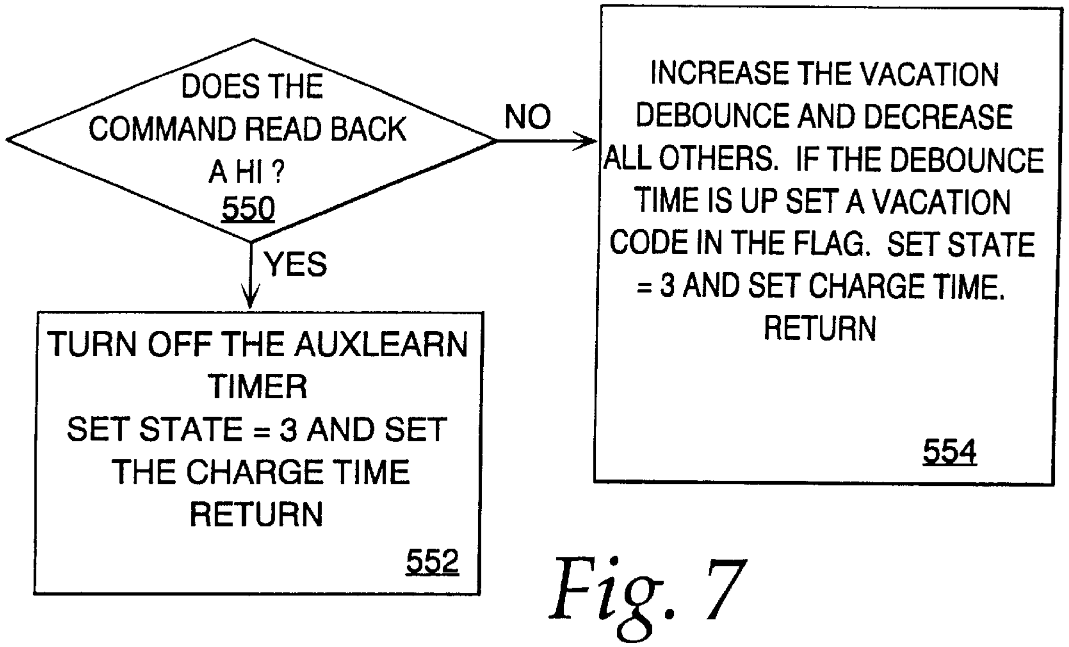
FIG. 7 is a flow chart of a vacation switch routine.
Figure 8:
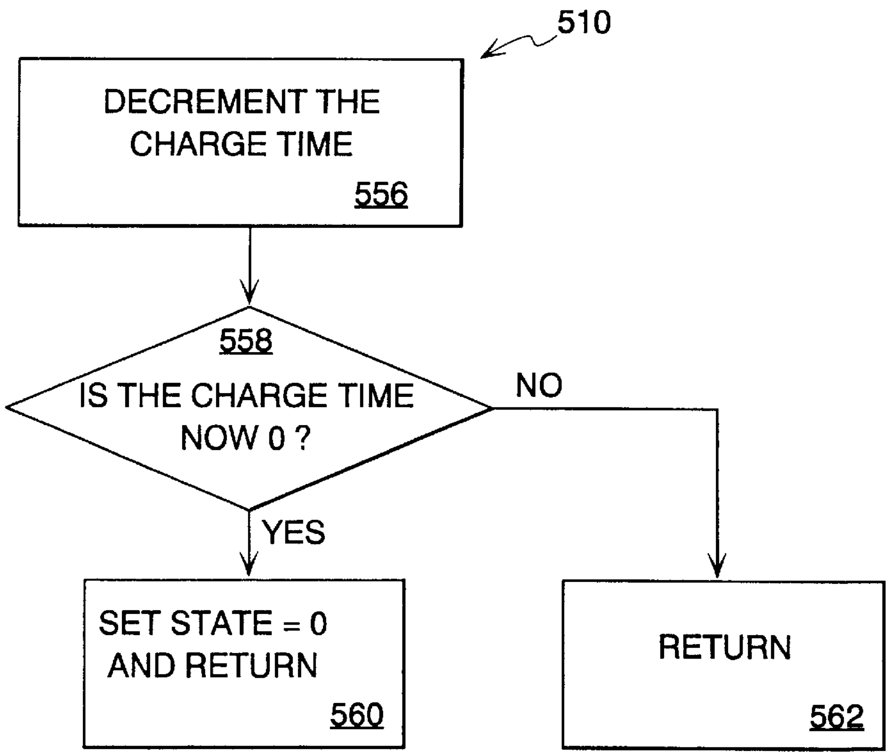
FIG. 8 is a flow chart of a switch charge routine.

In the event that the vacation mode routine 508 is entered, that routine is set forth in FIG. 7. In a step 550, a test is made to determine whether the command read back is a high. If it is, control is transferred to a step 552 in which the auxiliary learn timer is switched off. The state is set equal to 3, indicative of entry of the charging routine and the charge time is set followed by a return indicating a transfer back to the return step 512. If the command read black is not high, control is transferred to a step 554 in which the vacation debounce time is increased and all other button debounce times are decreased. If the vacation debounce time is expired, the vacation code flag is set, the set equal to 3 and the charge time is set to enter the charging routine.

In the event that the charging routine 510 is entered, the charge time is decremented in a step 556 followed by a step 558 in which the charge time is tested for whether it is equal to zero. If the charging time is zero, indicating it has expired, control is transferred to a step 560 setting the state to zero, indicating the command routine is to be entered next followed by a return. In the event that the charge time is not zero, a return step 562 is entered.

Figure 9A:
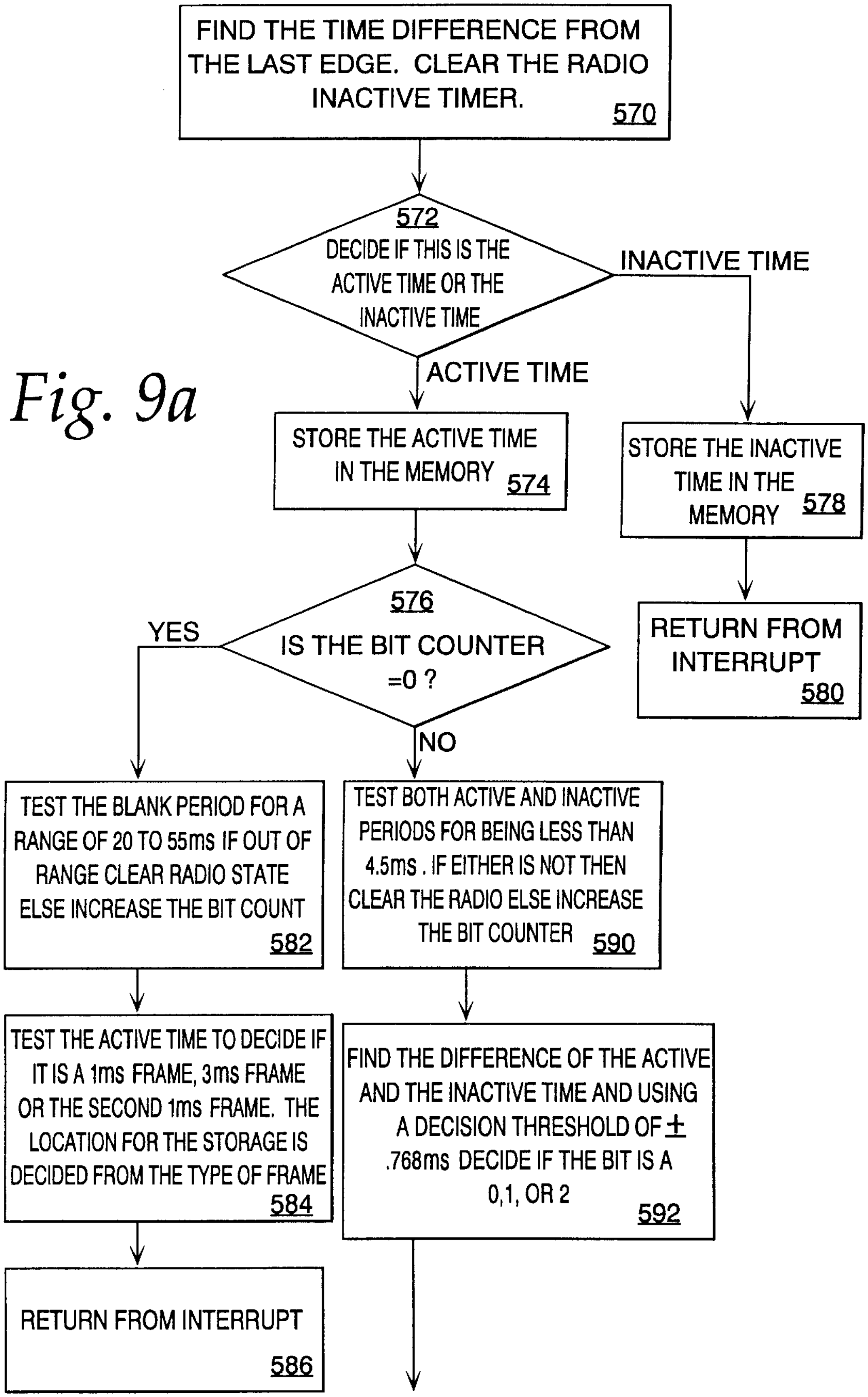
FIGS. 9A–C are a flow chart of a code learning or storage routine.
Figure 9B:
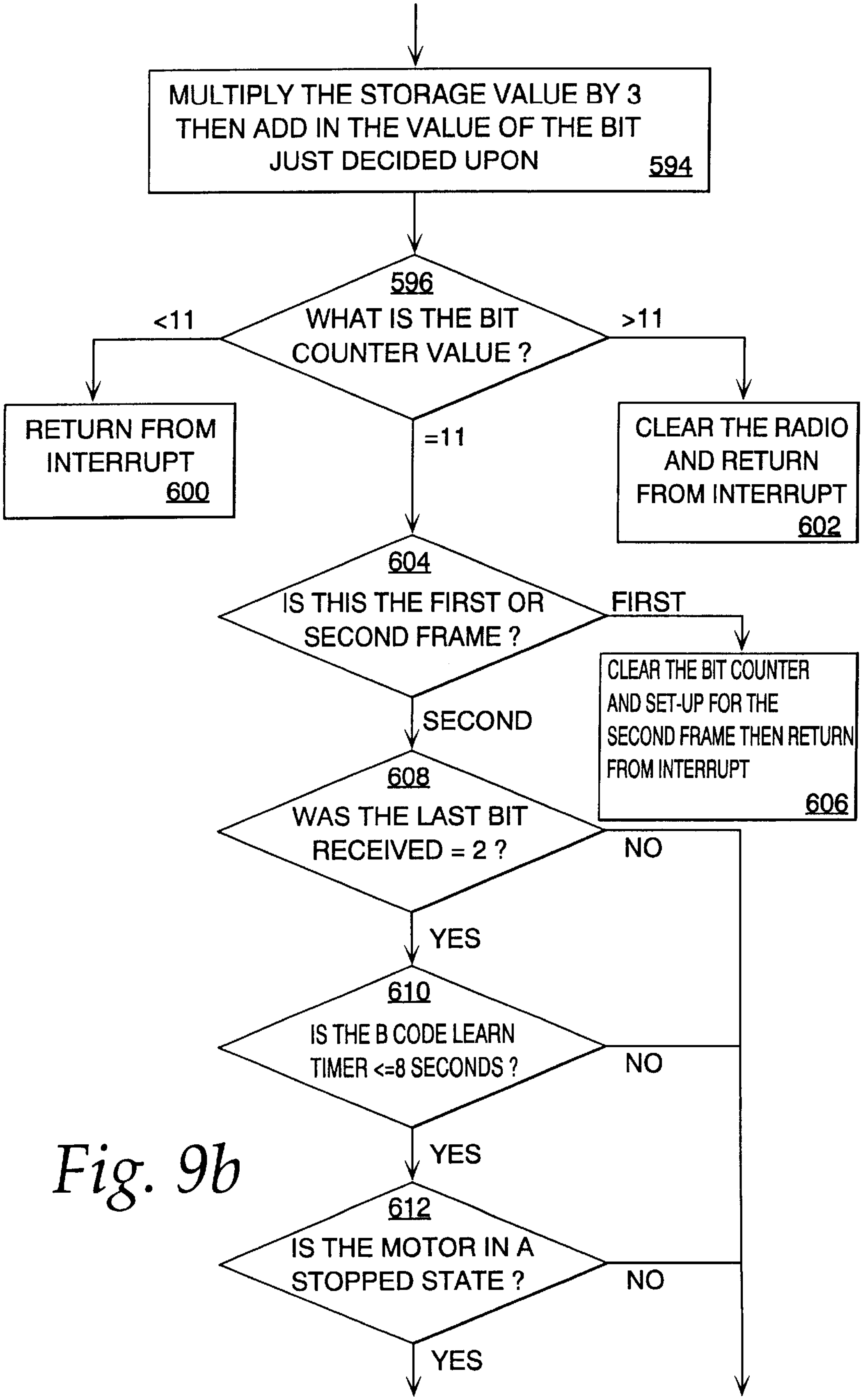
Figure 9C:
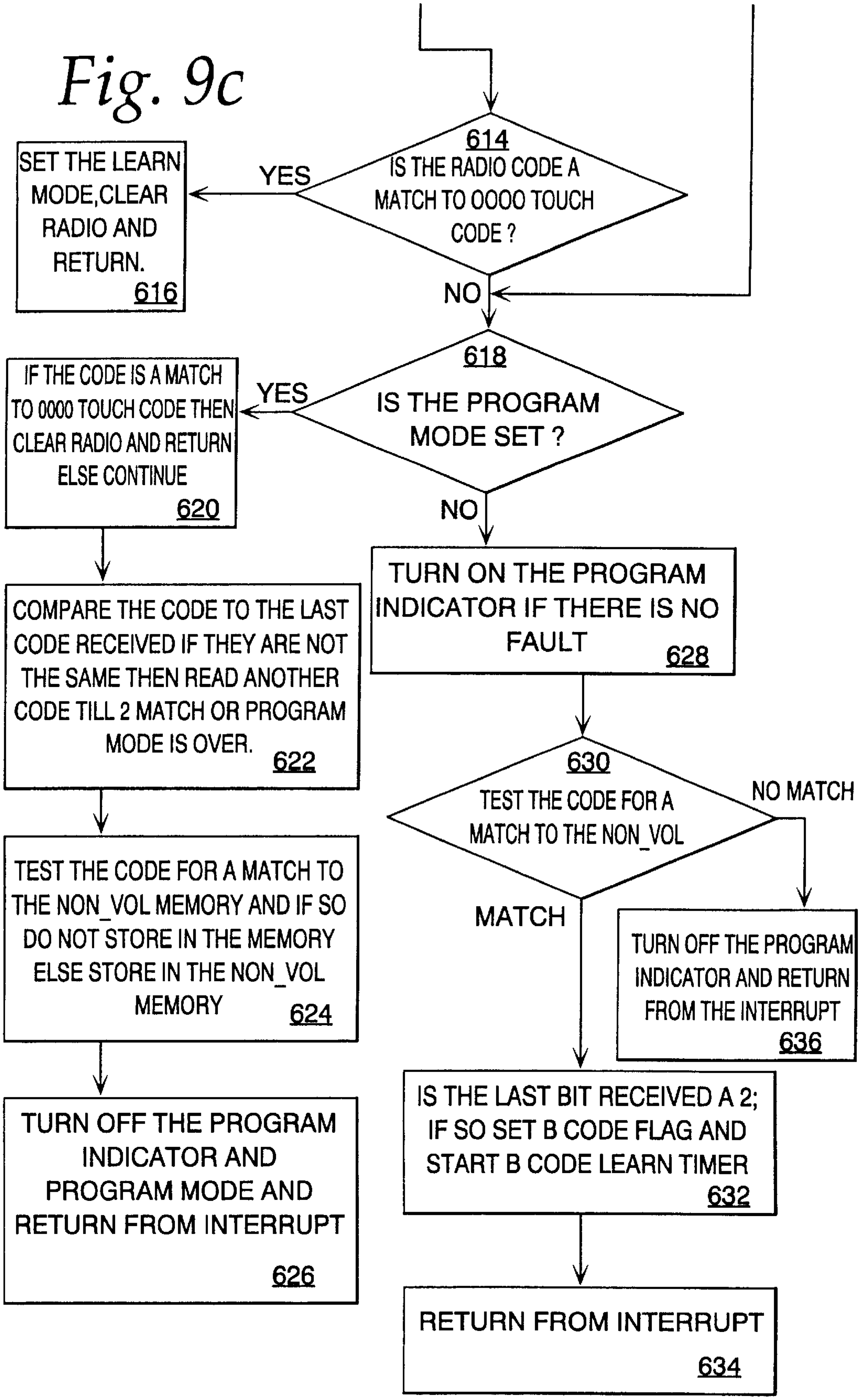

In addition to the four routines set forth in FIG. 4, a radio testing routine and learning routine is set forth in FIGS. 9*a* through 9*c*. A step 570 is entered, where a time difference determination is made between the last edge of a coded signal having been received from a transmission and the radio inactive timer is cleared. A decision step 572 is then entered to determine if it is an active time state or an inactive time state. In the event that it is an active time state, control is transferred to a step 574 causing the active time to be stored in the memory. The bit counter is tested to determine whether it equals zero in the step 576. In the event that the decision step 572 indicates that it is an inactive time, control is transferred to a step 578, storing the inactive time in the memory and a return is executed in a step 580. In the event that the bit counter tested for in step 576 is equal to zero, control is transferred to a step 582 testing the blank period in the radio signal to determine if it is in the range of 20 milliseconds to 55 milliseconds. If the blank or lack of radio signal period is outside of that range, the radio state is cleared. In the event that it is inside the range, the bit counter is increased by one. Control is then transferred to a step 584 where the active time is tested to determine if it is a 1 millisecond, 3 millisecond or the second 1 millisecond frame. The location for the storage is then determined from the frame typing and control is transferred to a step 586 where a return is executed from the interrupt. In the event that the bit counter is not zero in step 576, control is transferred to the step 590 to test both the active and inactive time periods to determine whether they are less than 5 milliseconds. If either is not less than 4.5 milliseconds, then the radio state is cleared. If not, the bit counter is incremented. Control is then transferred to a step 582 to determine the difference between the active and inactive times. A decision threshold of ±0.768 milliseconds is then employed to determine if a bit is equal to zero, one or two, which is a determine as to whether what the state is of a particular trinary bit or three-state bit having been received by the radio signal.

Having determined the state of the trinary bit, control is transferred to a step 594 where the storage value is multiplied by three, in effect by doing a shift and the value of the trinary bit established in step 592 is then added. Control is transferred to a step 596 to determine the bit counter value. If it is less than 11, control is transferred to a step 600 and the interrupt is returned from. If it is greater than 11, control is transferred to a step 602 in which the radio is cleared and the interrupt is returned from. If the bit value counter is equal to 11, control is transferred to a step 604 where there is a test made to determine whether the sink pulse having come in is indicative of a first or second frame. If it is indicative of a first frame, control is transferred to a step 606 where the bit counter is cleared an a set up is done for the second frame, following which there is a return from the interrupt. If the step 604 indicates that it is a second frame coming in control is transferred to a step 608 where a test is made to determine whether the last trinary bit received was equal to 2. If it is not, control is transferred to a step 618. If it is equal to 2, control is transferred to a decision block 610 where the B code learn timer is tested to determine whether it is less than or equal to 8 seconds. If it is not, control is transferred to the step 618. If it is, control is transferred to a test or decision step 612 to determine whether the electric motor 98, as indicated by the tachometer 100, is stopped. If the electric motor is stopped, control is then transferred to a step 614 where a test is made to determine whether the radio code is a match, and to determine whether a 000 code has been entered, indicative of the fact that the keypad is instructing the system to go into a learn mode. If step 614 testis yes, the control is transferred to a step 616 in which the new code is stored, the learn mode is set, the radio is cleared and a return is set to the step 512. If the step 614 tests negatively, control is transferred to the step 618 to determine whether the programming mode has been set by the programming switch 300. If it has, step 620 is entered, the code is tested for a match to the 000 touch code, the radio is cleared and the interrupt routine is exited or returned from. If not, control is transferred to the step 622 where the code is compared to the last code received. If they are not the same, then another code is read until two successive code frames match or the programming mode has expired. Control is then transferred to a step 624 where the code is tested for a match with code stored in non-volatile memory and, if it does match, no storage takes place. If it does not match, the new code is stored in the non-volatile memory. Control is then transferred to the step 626 where the program indicator is turned off and the program mode is exited and there is a return from the interrupt. In the event that the test in step 618 is negative, control is transferred to a step 628 to turn on the program indicator if there are no faults. Control is then transferred to a decision step 630 to test the code for a match with code stored in the non-volatile memory. If there is a match, control is transferred to the step 632 to determine whether the last trinary bit received is equal to a 2. If it is, a B code flag is set and the B code learn timer is started following which step 634 is entered and there is a return from the interrupt. In the event that there is no match found in the decision step 630, the program indicator is switched off and the interrupt routine is exited to return to step 512.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A code responsive security system for an operational apparatus, comprising:

a controller for controlling the operational apparatus in response to receipt of a received code when said received code matches a stored code;

a receiver for receiving a base band signal indicative of a code to be stored in a code storage unit;

a code generator for generating a code to be stored in said code storage unit; and, an input device for enabling code learning.

2. A code responsive security system, comprising:

a wireless receiver for receiving wireless command signals and producing authorization signals;

a command detector for detecting the authorization signals;

a storage device for storing an authorization signal template;

a wired control panel for generating a code signal;

a control panel signal receiver for connection via a baseband channel to the wired control panel;

an input device for generating a code programming signal; and a storage device for storing the code signal in a memory responsive to the programming signal and the authorization signal.

3. A code responsive security system according to claim 2, further comprising a timer for enabling the code signal storing means for a limited period after receipt of the code programming signal from the input device.

4. A code responsive security system for an operational apparatus, comprising:

a controller for controlling the operational apparatus in response to receipt of a code when the code matches a stored code;

a remote baseband signal generator producing a learn mode enable signal for transmission to a code storage unit of the security system; and a code generator for generating a code to be stored in the code storage unit.

5. A code responsive security system, comprising:

a radio frequency receiver;

a decoder coupled to receive a demodulated signal from the radio frequency receiver;

a learn mode code receiver for responding to a learn mode code received by the radio frequency receiver and producing a learn code enable signal in response thereto; and a storage device for storing a code received by the radio receiver subsequent to the learn enable code having been received.

6. A code responsive security system for an operational apparatus, comprising:

a serial communication receiver receiving a serial signal characterized by a variable time characteristic; and a controller for enabling or disabling the operational apparatus in response to said serial signal.

* * * * *